US010190805B2

United States Patent
Antonelli

(10) Patent No.: US 10,190,805 B2
(45) Date of Patent: *Jan. 29, 2019

(54) EASY-OPENING SOLAR COLLECTOR HAVING TEMPERATURE-RESPONSIVE MOUNT FOR POLYMER ABSORBER

(71) Applicant: UMA Distributors, LLC, Altamonte Springs, FL (US)

(72) Inventor: John L. Antonelli, Clermont, FL (US)

(73) Assignee: UMA Distributors, LLC, Altamonte Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,051

(22) Filed: Aug. 11, 2017

(65) Prior Publication Data

US 2017/0336103 A1 Nov. 23, 2017

Related U.S. Application Data

(63) Continuation of application No. 14/617,166, filed on Feb. 9, 2015, now Pat. No. 9,803,892.

(51) Int. Cl.
| | |
|---|---|
| *F24S 80/50* | (2018.01) |
| *F24S 40/80* | (2018.01) |
| *F24S 80/58* | (2018.01) |
| *F24S 80/40* | (2018.01) |
| *F24S 80/30* | (2018.01) |
| *F24S 40/10* | (2018.01) |

(Continued)

(52) U.S. Cl.
CPC .............. *F24S 80/50* (2018.05); *F24S 10/73* (2018.05); *F24S 40/10* (2018.05); *F24S 40/80* (2018.05); *F24S 80/30* (2018.05); *F24S 80/40* (2018.05); *F24S 80/58* (2018.05); *F24S 70/14* (2018.05); *F24S 2025/6003* (2018.05); *Y02B 10/20* (2013.01); *Y02E 10/40* (2013.01); *Y02E 10/44* (2013.01)

(58) Field of Classification Search
CPC .......... Y02B 10/20; Y02B 10/22; Y02B 10/24
See application file for complete search history.

(56) References Cited

U.S. PATENT DOCUMENTS 3,987,783 A * 10/1976 Powell ................... F24S 10/75
126/661
4,120,285 A * 10/1978 Nugent .................. F24S 23/77
126/653

(Continued)

*Primary Examiner* — David J Laux
(74) *Attorney, Agent, or Firm* — Nicholas Pfeifer; Smith & Hopen, P.A.

(57) ABSTRACT

A solar collector housing that is opened and closed without tools includes structure for accommodating temperature-related expansion and contraction of a polymer absorber housed within the collector. The housing includes a transparent cover, a frame for holding the transparent cover, and a base. The cover, frame and base collectively define a hollow interior within which the polymer absorber is positioned. A plurality of latches is secured to an exterior of the frame. The frame and base are pivotally connected to one another when the latches are open so that the collector housing can be opened. The housing cannot be opened when the latches are closed. A pair of variable gate closure components are positioned in slots formed in a second end of the collector and enable the polymer absorber to expand and contract without placing stress on the absorber tubes.

16 Claims, 10 Drawing Sheets

(51) Int. Cl.
    *F24S 10/70*     (2018.01)
    *F24S 25/60*     (2018.01)
    *F24S 70/14*     (2018.01)

(56) References Cited

U.S. PATENT DOCUMENTS

| | | | | |
|---|---|---|---|---|
| 4,202,320 | A * | 5/1980 | Bowen | F24S 10/504 |
| | | | | 126/660 |
| 4,471,764 | A * | 9/1984 | Calvert | F24S 80/45 |
| | | | | 126/704 |
| 4,535,756 | A * | 8/1985 | Rinehart | F24S 80/70 |
| | | | | 126/710 |
| 8,247,685 | B2 * | 8/2012 | Hunter | F24S 30/425 |
| | | | | 136/259 |
| 2007/0199561 | A1 * | 8/2007 | Soucy | F24S 80/40 |
| | | | | 126/623 |
| 2011/0226233 | A1 * | 9/2011 | Schwarz | F24S 10/90 |
| | | | | 126/635 |

* cited by examiner

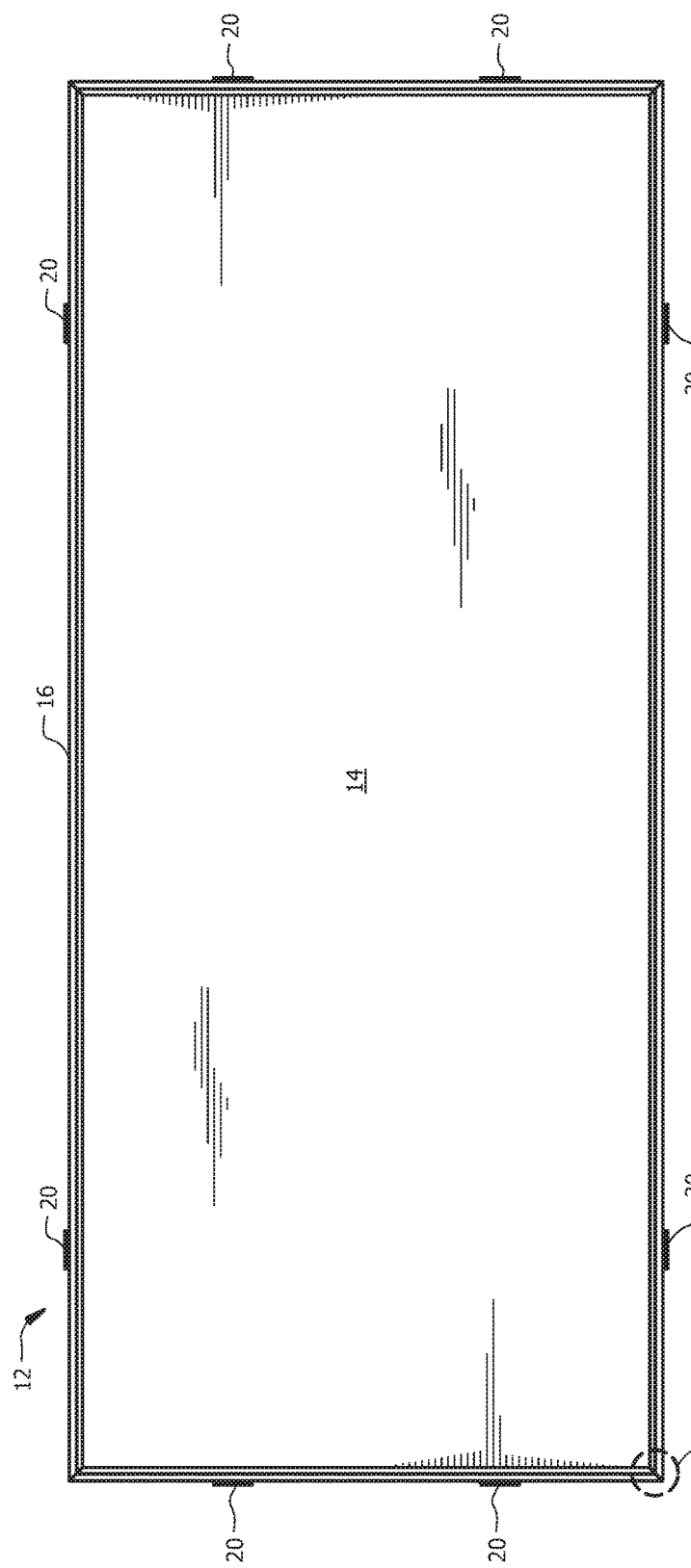

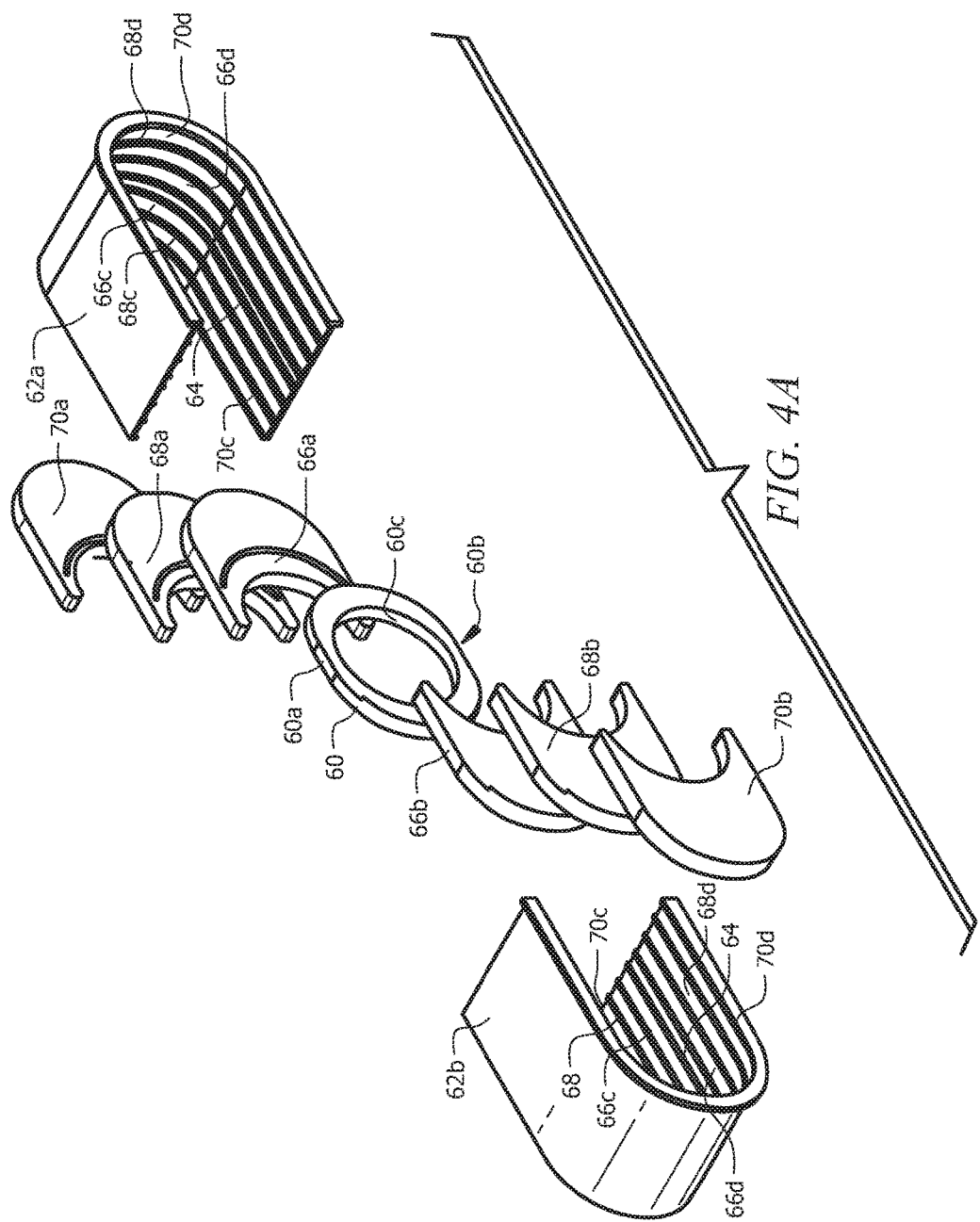

EASY-OPENING SOLAR COLLECTOR HAVING TEMPERATURE-RESPONSIVE MOUNT FOR POLYMER ABSORBER

CROSS-REFERENCE TO RELATED APPLICATIONS

This nonprovisional application is a continuation of and claims priority to provisional application Ser. No. 14/617,166, entitled "EASY-OPENING SOLAR COLLECTOR HAVING TEMPERATURE-RESPONSIVE MOUNT FOR POLYMER ABSORBER," filed Feb. 9, 2015 by the same inventor.

BACKGROUND OF THE INVENTION

1. Field of the Invention

This invention relates, generally, to solar collectors. More particularly, it relates to solar collector housings that are easily opened and closed without tools. It also relates to solar collectors having polymer absorbers that expand and contract as temperatures rise and fall without placing stress on absorber tubes.

2. Description of the Prior Art

Conventional solar collectors include a cover and a base that are secured to one another by conventional fastening means including screws, nuts, rivets and the like. These fasteners perform well but require the use of tools. Opening and closing such housings cannot be accomplished quickly due to the large numbers of fastening members.

Thus, there is a need for a solar collector housing that can be opened and closed quickly without the use of tools.

Unlike conventional metallic absorbers, polymer absorbers used in some solar collectors are subject to significant length changes due to thermal expansion and contraction. Over the course of a sunny day the absorber may experience temperature swings that may exceed 150° F., resulting in a change in length that may exceed an inch.

Prior art solar collectors mount both ends of the metallic absorber in a fixed position. The greater temperature-responsive expansion and contraction that polymer absorbers experience puts stress on the absorber tubes and eventually causes a leak or total failure. The art of solar collectors has long accepted this problem as being an inherent weakness of polymer absorbers and has responded to the problem by somehow allowing for the length change of polymer absorbers and the absorber tubes as needed.

Thus, there is a need for an improved mounting means for a polymer absorber. The improved mounting means would accommodate the temperature-related expansion and contraction of a polymer absorber but would not make polymer absorber installation more difficult.

However, in view of the prior art considered as a whole at the time the present invention was made, it was not obvious to those of ordinary skill in the art that the use of conventional, tool-requiring fastening members to secure the cover to the base was unacceptable. Nor was it obvious that a better mounting means for the polymer absorber was needed. It follows that the solution to both unperceived problems were not obvious.

SUMMARY OF THE INVENTION

The long-standing but heretofore unfulfilled need for a solar collector housing that can be opened and closed manually, i.e., without tools, and which includes means for accommodating changes in length of the polymer absorber housed within the collector is now met by a new, useful, and non-obvious invention.

The novel solar collector includes a housing including a transparent cover, a frame for holding the transparent cover, and a base. The cover, frame and base collectively define a hollow interior within which a polymer absorber is positioned.

A plurality of latches is secured to an exterior of the frame about a perimeter of the frame. Each latch has an open configuration and a closed configuration. The frame and base may be separated from one another when the latches are in their respective open configurations and the frame and base may not be separated from one another when the latches are in their respective closed configurations.

The latches are opened and closed by hand, i.e., manually, so no tools are required to open and close the housing and the time required to open or close the housing is substantially less than the time required to do so when the housing is closed by conventional fastening members.

The frame has a square or rectangular structure formed by a pair of longitudinally extending, transversely spaced apart sidewalls and a pair of transversely disposed, longitudinally spaced apart end walls. The base has a mating structure formed by a pair of longitudinally extending, transversely spaced apart sidewalls and a pair of transversely disposed, longitudinally spaced apart end walls.

A first transversely disposed manifold having a hollow interior in open fluid communication with a first end of the absorber tubes is secured to a first end of a polymer absorber. A manifold pipe that is not in fluid communication with the heat transfer liquid fluid in the absorber tubes is integrally formed with each opposed end of the first manifold in axial alignment therewith and such manifold pipes enable pivotal mounting of the cover frame to the base.

In an alternative embodiment, instead of providing a manifold pipe at the opposite ends of the first manifold, the first manifold is lengthened to that its opposite ends are outboard of the outermost absorber tubes. In this way, the outermost ends of the first manifold perform the same function as the manifold pipes. Accordingly, reference is hereinafter made to the outermost ends/manifold pipes of the first manifold.

An aperture is formed in a first end of each of the sidewalls of the frame and an aperture axially aligned therewith is formed in a first end of each of the sidewalls of the base, i.e., the apertures formed in the frame are in registration with the apertures formed in the base when the cover is in its closed position. The apertures pivotally receive the outermost ends/manifold pipes of the first manifold so that when the latches are in their respective open configurations, the collector is opened or closed by rotating the cover with respect to the frame about said outermost ends/manifold pipes.

Each latch has a flat base secured to the sidewalls of the frame and each latch has two primary mounting lugs extending from the flat base in normal relation thereto in lateral relation to one another on opposite sides of a vertical axis of symmetry of the flat base in equidistant relation to the vertical axis of the flat base.

An aperture is formed near a distal free end of each primary mounting lug. Each latch also has a second pair of mounting lugs extending from the flat base in normal relation to the flat base and in lateral relation to one another on opposite sides of and in equidistantly spaced relation to a vertical axis of symmetry of the flat base.

An aperture is also formed in the distal free end of each mounting lug of the second pair of mounting plugs.

A latch pull is pivotally connected at a first end to each mounting lug of the second pair of mounting lugs. The latch pull has a preselected length so that a second end of the latch pull abuts the flat base adjacent each primary mounting lug when the latch pull is pivoted from its open configuration to its closed configuration.

The latch pull has a thickness less than an extent of each primary mounting lug so that when the latch pull abuttingly engages the flat base, the apertures formed in the primary mounting lugs are adapted to receive a pin therethrough to prevent reverse pivoting of each latch pull.

A first end of the latch catch is pivotally mounted to an associated latch pull. The latch pull and latch catch are positioned in angular relation to one another when the latch catch is in its open configuration and when the latch pull is rotated from its open position to its closed position.

A second end of said latch catch engages and retains the base, thereby securing the cover to the base when the latch pull abuts the flat base of the latch.

A second transversely disposed manifold having a hollow interior in fluid communication with the absorber tubes is secured to a second end of the polymer absorber and a second manifold pipe is secured to the opposite ends of said second manifold. Like the manifold pipes at the first end of the polymer absorber, the manifold pipes at the second end of the polymer absorber are integrally formed with and in axial alignment with the second manifold but are not in fluid communication with the absorber tubes, i.e., the heat transfer liquid fluid in the absorber tubes does not flow into said manifold pipes.

However, it is also within the scope of this invention to use the opposite ends of the second manifold as manifold pipes and in such event the opposite ends of the second manifold extend outboard of the outermost absorber tubes. Accordingly, the respective opposite ends of the first and second manifolds are referred to as opposite ends/manifold pipes. In the claims that follow, reference to outermost ends shall be interpreted as including outermost ends of a manifold or to a manifold pipe attached to each outermost end.

A longitudinally-extending slot is formed in a second end of each of the sidewalls of said frame, there being a pair of transversely spaced apart slots in said second end of said frame. A longitudinally-extending slot is formed in a second end of each of the sidewalls of the base as well, there being a pair of transversely spaced apart slots in the second end of the base.

The respective pairs of slots formed in the frame and the base are in registration with one another. A variable gate closure component (VGC component) is positioned within both of the pairs of slots, there being two VGC components in transversely spaced apart relation to one another. The VGC components respectively receive the opposite ends/manifold pipes of the second manifold.

Each VGC component includes a flat, generally circular grommet having a flat formed in a top edge and a bottom edge, and having an aperture formed centrally thereof. The opposite ends/manifold pipes of the second manifold are disposed in engaged relation to an associated central aperture.

The VGC component includes an elongate frame having a generally oblong configuration. A plurality of parallel guide tracks is formed in an interior surface of the elongate VGC component frame. The plurality of guide tracks includes a center guide track that slideably receives the grommet. The grommet slides in its track in response to expansion or contraction of the polymer absorber.

A pair of interior guide tracks is formed in the interior surface on opposite, outboard sides of the center guide track and an interior panel is slideably received within both of the interior guide tracks.

Each interior panel of the pair of interior panels has a generally C-shaped structure and has flats formed in their respective top and bottom edges. The flats slideably engage their respective guide tracks and are displaced when the grommet is displaced.

The plurality of guide tracks further includes a pair of middle guide tracks formed in the interior surface of the VGC component frame on opposite, outboard sides of the interior guide tracks in parallel relation to the center tracks and to said interior tracks.

A pair of middle panels is slideably received within the middle guide tracks. Each middle panel of the pair of middle panels has a generally C-shaped structure and has flats formed in their respective top and bottom edges. The flats slideably engage their respective guide tracks and are displaced when the interior panels are displaced due to displacement of the grommet.

The plurality of guide tracks further includes a pair of exterior or outer guide tracks formed in the interior surface of the VGC component frame on opposite, outboard sides of the middle guide tracks. A pair of exterior or outer panels is slideably received within the exterior guide tracks. Each exterior panel of the pair of exterior panels has a generally C-shaped structure and has flats formed in their respective top and bottom edges. The flats slideably engage their respective guide tracks and are displaced when the middle panels are displaced.

It should therefore be understood that the grommet engages the interior panels so that said interior panels slide when the grommet slides, the interior panels engage the middle panels so that said middle panels slide when the interior panels slide, and said middle panels engage the exterior panels so that said exterior panels slide when the middle panels slide. Outside or ambient air therefore cannot enter into the slots occupied by the VGC component. The grommet of the VGC component moves conjointly with the polymer absorber as said polymer absorber lengthens and shortens, thereby eliminating stress on the absorber tubes.

An important object of the invention is to provide a solar collector housing that can be opened and closed quickly and easily by one person in the absence of tools.

A more specific object is to facilitate the opening and closing of the collector by providing manually-operated latches that are secured about the periphery of the frame that holds the transparent cover, which enable opening of the cover when in an open configuration and which secure the cover to the base when the collector is closed.

Another important object is to remove the stress from absorber tubes by attaching one end of the polymer absorber to a grommet that slides in a guide track in response to temperature-responsive expansions and contractions of the polymer absorber.

A closely related object is to provide panels that slide with the grommet so that ambient air cannot enter into the collector housing as the grommet slides.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 2A is a plan view of the cover;

FIG. 4A is an exploded perspective view of the novel VGC component;

DETAILED DESCRIPTION OF THE PREFERRED EMBODIMENT

Figure 1:
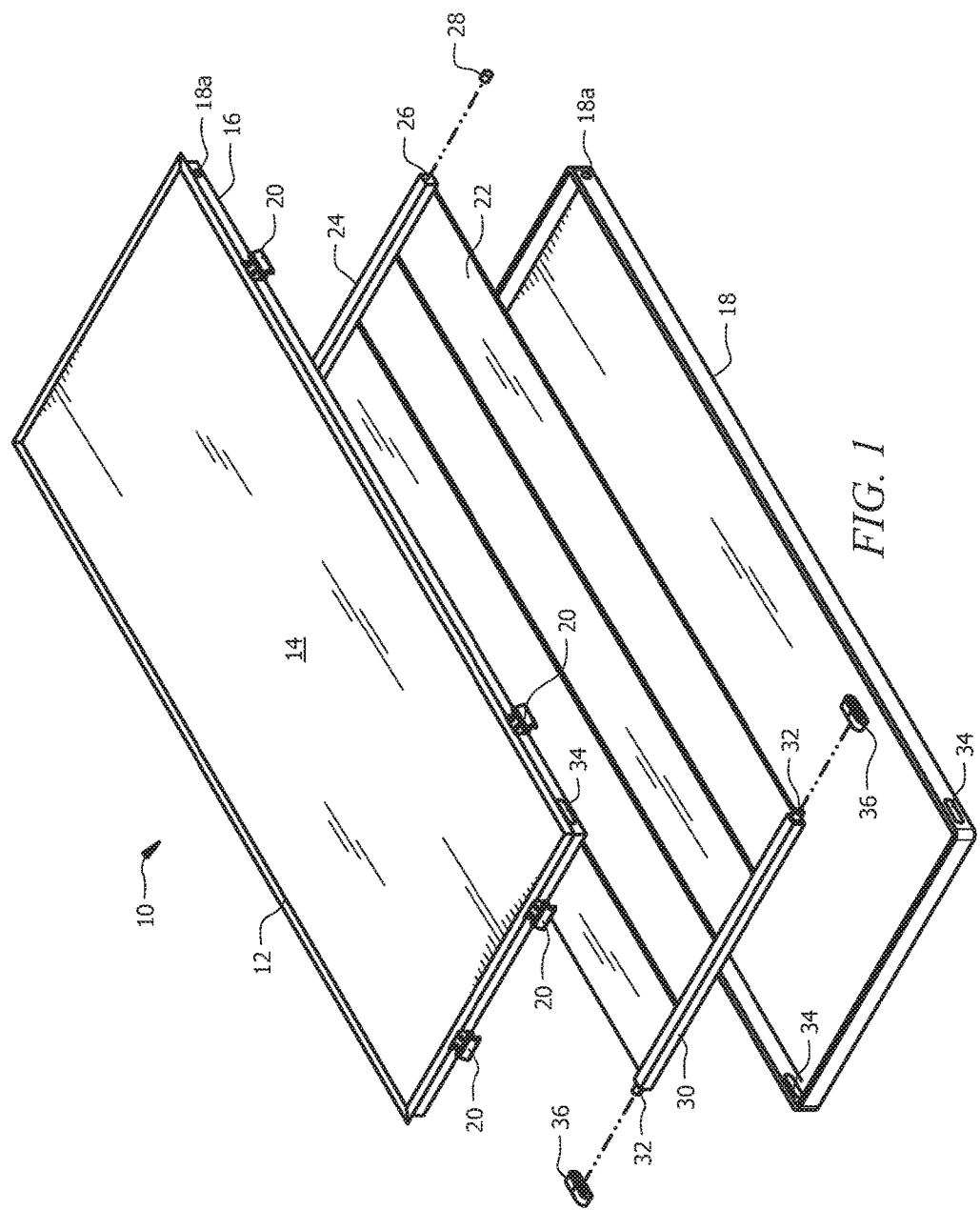
FIG. 1 is an exploded perspective view of the novel collector.

FIG. 1 is an exploded view of an illustrative embodiment of the novel structure, denoted as a whole by the reference numeral 10.

Solar collector 10 has a conventional rectangular shape. Cover 12 of collector 10 includes glazed glass or other suitable transparent material 14 which is mounted in frame 16. Base 18 is an aluminum skinned formed foam box which underlies cover 12 and is secured to said cover by a plurality of novel latches, collectively denoted 20, which are secured to said frame 16. As depicted, each end of frame 16 has a pair of the novel latches secured thereto, preferably disposed on opposite sides of the longitudinal axis of symmetry of frame 16 in equidistant relation thereto. Each side of frame 16 also has a pair of the novel latches, preferably disposed on opposite sides of the transverse axis of symmetry of frame 16 in equidistant relation thereto.

Polymer absorber 22 is positioned in an interior space that is formed by connecting cover 12 to base 18. A first transversely disposed manifold 24 is secured to a first end of polymer absorber 12. Manifold pipe 26 is secured to the opposite ends of the first manifold in axial alignment therewith, it being understood that one manifold pipe is obscured in said Figure. In the alternative, first manifold 24 is lengthened so that its opposite ends extend beyond, i.e., outboard of the outermost absorber tubes in the polymer absorber and said opposite ends perform the same functions as manifold pipes 26.

Figure 2B:
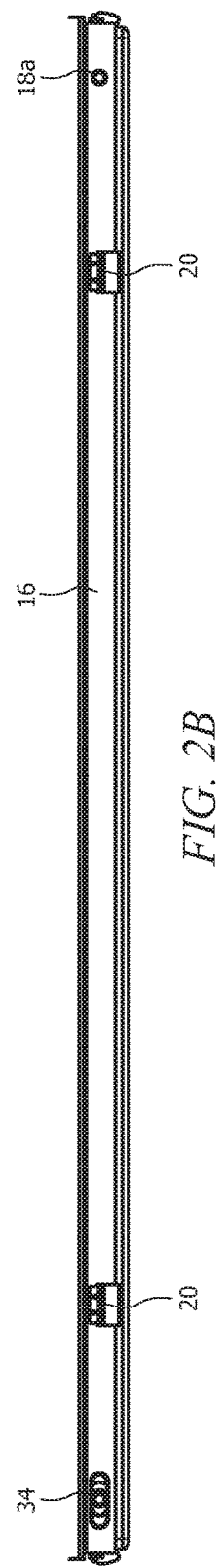
FIG. 2B is a front elevation view of the cover.

Opening 18a is formed in cover frame 16 and in base 18 at a leading end thereof as depicted in FIGS. 1 and 2B and said opening pivotally receives a first end of outermost end/manifold pipe 26. The pivotal connection is secured by grommet 28. A second opening 18a is formed in base 18 in transversely opposed relation to the depicted opening 18a in FIG. 1 and is obscured by cover 12. That second opening pivotally receives the opposite end of outermost end/manifold pipe 26 and a second grommet secures that connection.

Second manifold 30 is mounted to the opposite end of polymer absorber 22 and it has the same structure as first manifold 24, i.e., it may have a manifold pipe 32 secured to its opposite ends or it may be lengthened so that its opposite ends extend outboard of the outermost absorber tubes so that said opposite ends perform the same function as such manifold pipes.

Elongate slots 34, 34 are formed in base 18 near its trailing end. Each opposite end/manifold pipe of second manifold 30 is engaged by a novel device referred to herein as a variable gate closure or VGC component 36.

Figure 2C:
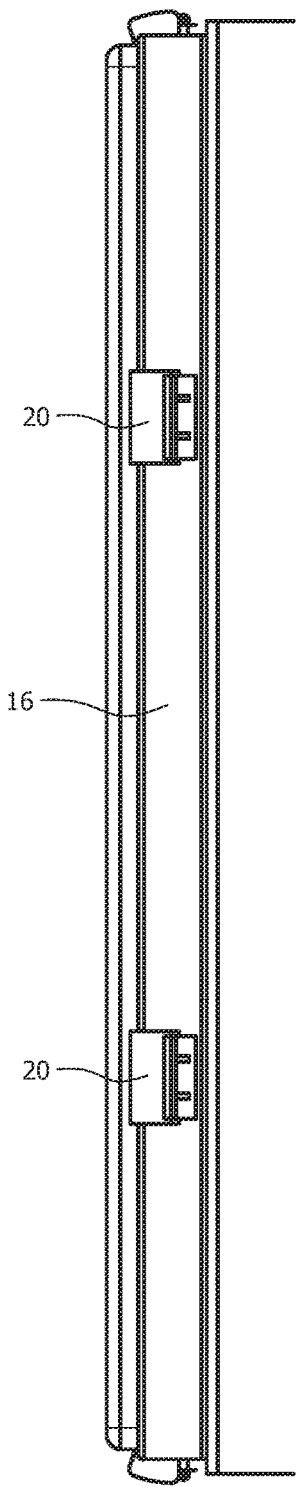
FIG. 2C is an end elevation view of the cover.
Figure 2D:
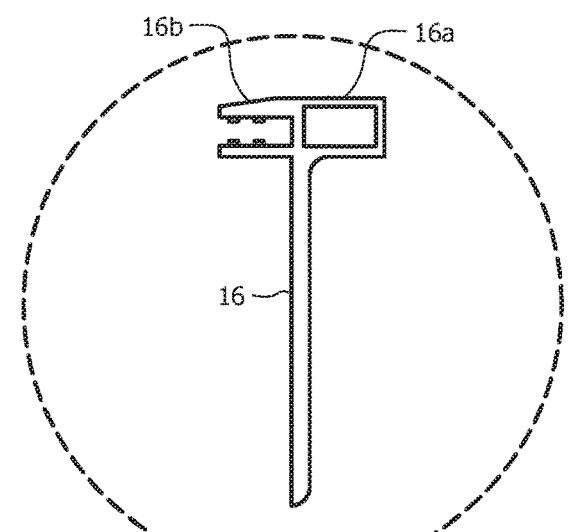
FIG. 2D is an enlarged view of the circled area of FIG. 2A.

FIGS. 2A, 2B and 2C provide plan, side, and end views of cover 12. FIG. 2D is an enlarged view of the circled corner in FIG. 2A. It discloses that the outer border of frame 16 has a box-like frame 16a and the inner border 16b thereof has two vertically spaced apart projections that receive glazed glass or other suitable transparent material 14 between them. Each projection has glaze-engaging teeth formed in it to enhance its grip on the outer edge or border of said glazed glass 14.

Figure 3A:
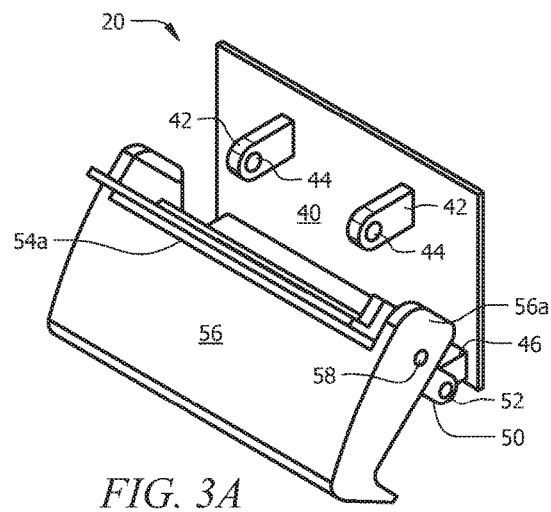
FIG. 3A is a perspective view of the novel frame latch.

FIG. 3A depicts a latch 20 in perspective view. Flat base 40 is secured to sidewalls 16 of cover 12. Two (2) mounting lugs, collectively denoted 42, extend from base 40 in normal relation thereto in lateral relation to one another on opposite sides of a vertical axis of symmetry of said latch 20, in equidistant relation to said vertical axis. An aperture 44 is formed near the distal free end of each mounting lug. Each mounting lug is flat and has a vertical axis parallel to the vertical axis of symmetry of latch 20. As used herein, terms such as "vertical" and "horizontal" refer to a solar collector 10 disposed in a horizontal plane on a flat roof so that sidewalls 16 thereof are in a vertical plane.

Figure 3B:
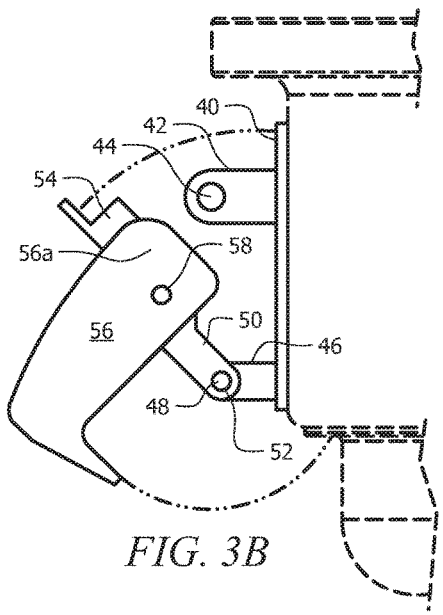
FIG. 3B is a side elevation view depicting the frame latch in an open configuration.
Figure 3C:
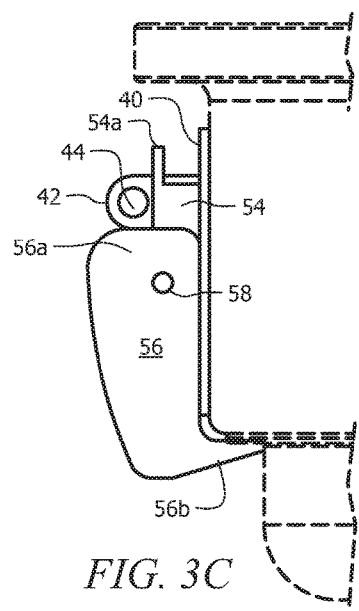
FIG. 3C is a side elevation view depicting the frame latch in its closed configuration.

Two (2) further mounting lugs are collectively denoted 46 although only one (1) of them can be seen in FIGS. 3A-C. Lugs 46 are also flat and they also extend from flat base 40 in normal relation to said flat base in lateral relation to one another on opposite sides of and in equidistantly spaced relation to a vertical axis of symmetry of said flat base, but they are preferably spaced further from one another than are mounting lugs 42, 42. An aperture 48 (depicted in FIGS. 3A and 3B but labeled only in FIG. 3B to avoid cluttering the drawings) is formed in the distal free end of each mounting lug 46.

A latch pull 50 is pivotally connected at a first end by a pivot pin to each mounting lug 46 as at 52 on the outboard side thereof. Latch pull 50 is formed of a rigid material and its length is preselected so that second end 54 thereof abuts flat base 40 on the outboard side of each mounting lug 42, 42 when latch pull is pivoted about pivot pin 52 from its FIG. 3A or FIG. 3B position to its FIG. 3C position.

Latch pull 50 has a thickness less than the extent of each mounting lug 42, 42 so that when said latch pull 50 abuttingly engages flat base 40, apertures 44, 44 formed in said mounting lugs are clear. A clevis pin, not depicted, or other suitable locking means is then inserted through each aperture 44, 44, preventing reverse pivoting of each latch pull 50.

Latch catch 56 is also formed of a rigid material and has a lateral extent slightly greater than the lateral spacing between mounting lugs 46, 46 so that its opposite end is positioned outboard of said mounting lugs 46, 46. A first end 56a of latch catch 56 is pivotally mounted as at 58 to each latch pull 50, 50 about midway between ends 52 and 54 of said latch pull. Latch pull 50 and latch catch 56 are positioned roughly normal to one another when latch catch 56 is in its open configuration as depicted in FIGS. 3A and 3B. When latch pull 50 is rotated from its open position of FIGS. 3A and 3B to its closed position of FIG. 3C, latch pull 50 and latch catch 56 remain in their respective, mutually normal positions.

After latch pull 50 abuts flat base 16 and a clevis pin or the like is inserted into each aperture 44 to prevent reverse rotation, latch catch 56 is then rotated from its open configuration of FIGS. 3A and 3B into its closed position of FIG. 3C. Second end 56b of latch catch 56 then engages and retains base/aluminum skinned formed foam box 18, thereby securing said base 18 to cover 12. This enables the locking procedure of all six (6) latches 20 to be performed by one (1) installer in just a few moments. Collectors of differing sizes may have more or fewer latches but in all cases the novel locking procedure is much faster than the locking procedures of the prior art.

Projection 54a at the upper end 54 of latch pull 50 provides a finger-engageable part that facilitates opening of latch 20 when the undepicted locking pin/clevis pin is removed. Such pin is not removed until after second end 56b of latch catch 56 is rotated away from its engagement with base 18.

Variable gate closure or VGC component 36 is depicted in FIGS. 4A-4E and in FIGS. 5A-5D. In view of the temperature-related changes in length that a polymer absorber undergoes, a first end of the absorber needs to have a fixed position while a second end needs freedom to move longitudinally. VGC component 36 moves with the second end of the polymer absorber while keeping the inside of the collector enclosure isolated from outside air.

Figure 4B:
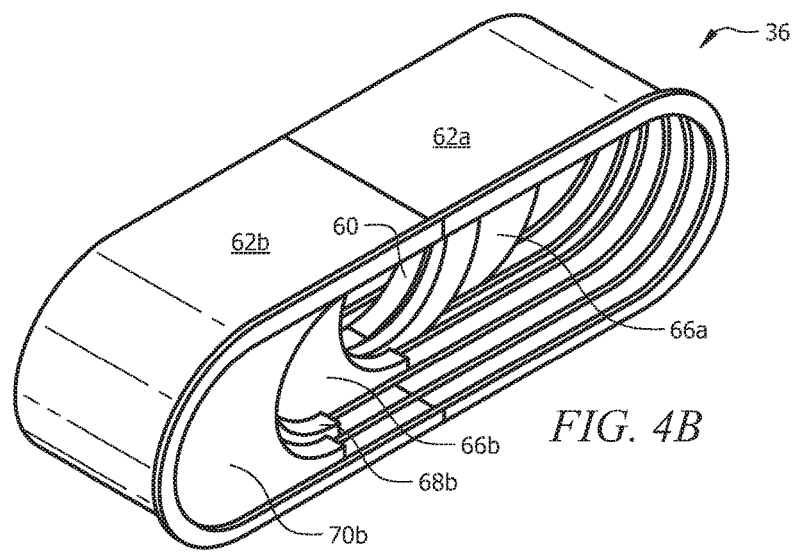
FIG. 4B is a perspective view of an assembled VGC component.

As best understood in the exploded perspective view of FIG. 4A and in the assembled perspective view of FIG. 4B, VGC component 36 includes grommet 60 which is flat and generally circular but with a flat formed in its top edge 60a and its bottom edge 60b, and which has aperture 60c formed centrally thereof. Aperture 60c engages the opposite ends/manifold pipes 32 of second manifold 30 when novel collector housing 10 is fully assembled.

In this preferred embodiment, seven (7) grooves or guide tracks are formed on the inner surface of each part of confronting frame parts 62a, 62b. Center guide track 64 is slightly narrower than the other guide tracks and slideably receives grommet 60 when said parts 62a, 62b abut one another as depicted In FIGS. 4A and 4B.

Grommet 60 is flanked by and engages a pair of interior panels 66a, 66b which are slideably received within interior guide tracks 66c, 66d, respectively, when VGC component 36 is fully assembled.

Interior panels 66a, 66b are flanked by and engage a pair of middle panels 68a, 68b which are slideably received within middle guide tracks 68c, 68d, respectively, when VGC component 36 is fully assembled.

Middle panels 68a, 68b are flanked by and engage a pair of outer panels 70a, 70b which are slideably received within outer guide tracks 70c, 70d, respectively, when VGC component 36 is fully assembled.

The interior, middle and outer panels are generally C-shaped and have flats formed in their respective top and bottom edges, just as in grommet 60. The flats are not numbered to avoid clutter. They slideably engage their respective guide tracks when grommet 60 slides in central guide track 64.

Each grommet 60 is free to slide in its central guide track 64 when an installer places the outermost ends/manifold pipes 32, 32 of second manifold 30 in apertures 60c, 60c while installing polymer absorber 22.

Figure 4C:
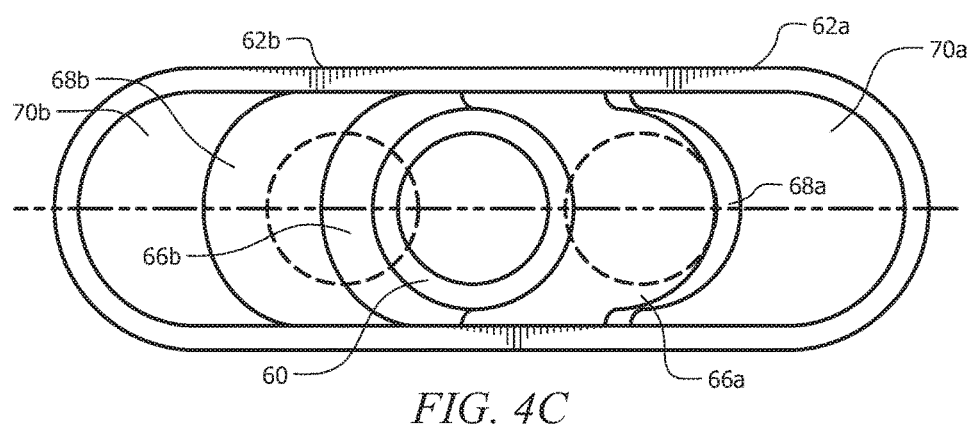
FIG. 4C is a side elevation view of an assembled VGC component when the grommet is in its centered retracted position.

FIG. 4C depicts the central position of grommet 60 where it is centered in VGC component 36, i.e., when the polymer absorber is in a position of repose, i.e., neither extended nor contracted.

Figure 4D:
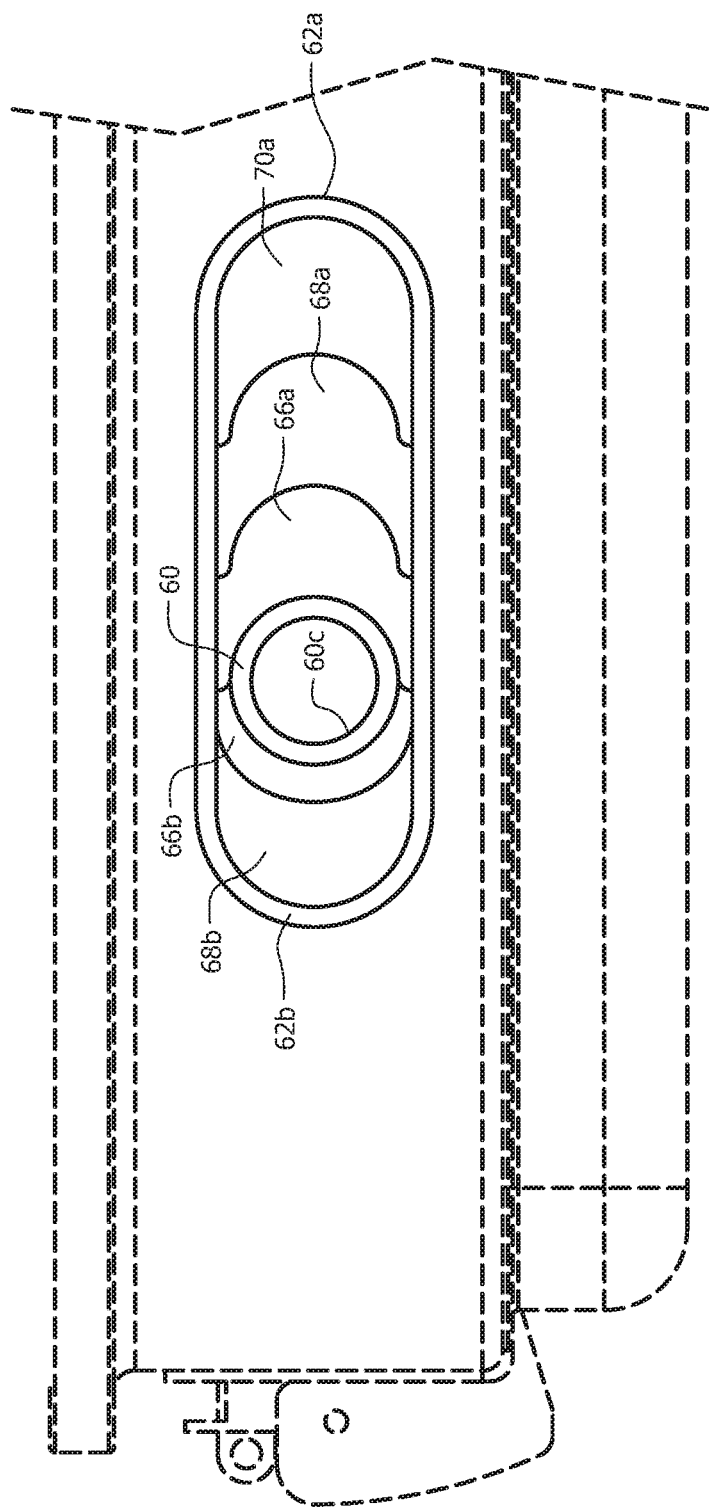
FIG. 4D is a side elevation view of an assembled VGC component when the center of the grommet is in its fully extended position.

FIG. 4D depicts the fully extended position of grommet 60 where it has slid in its guide track towards the second end of collector 10 due to temperature-related expansion of the polymer absorber.

Figure 4E:
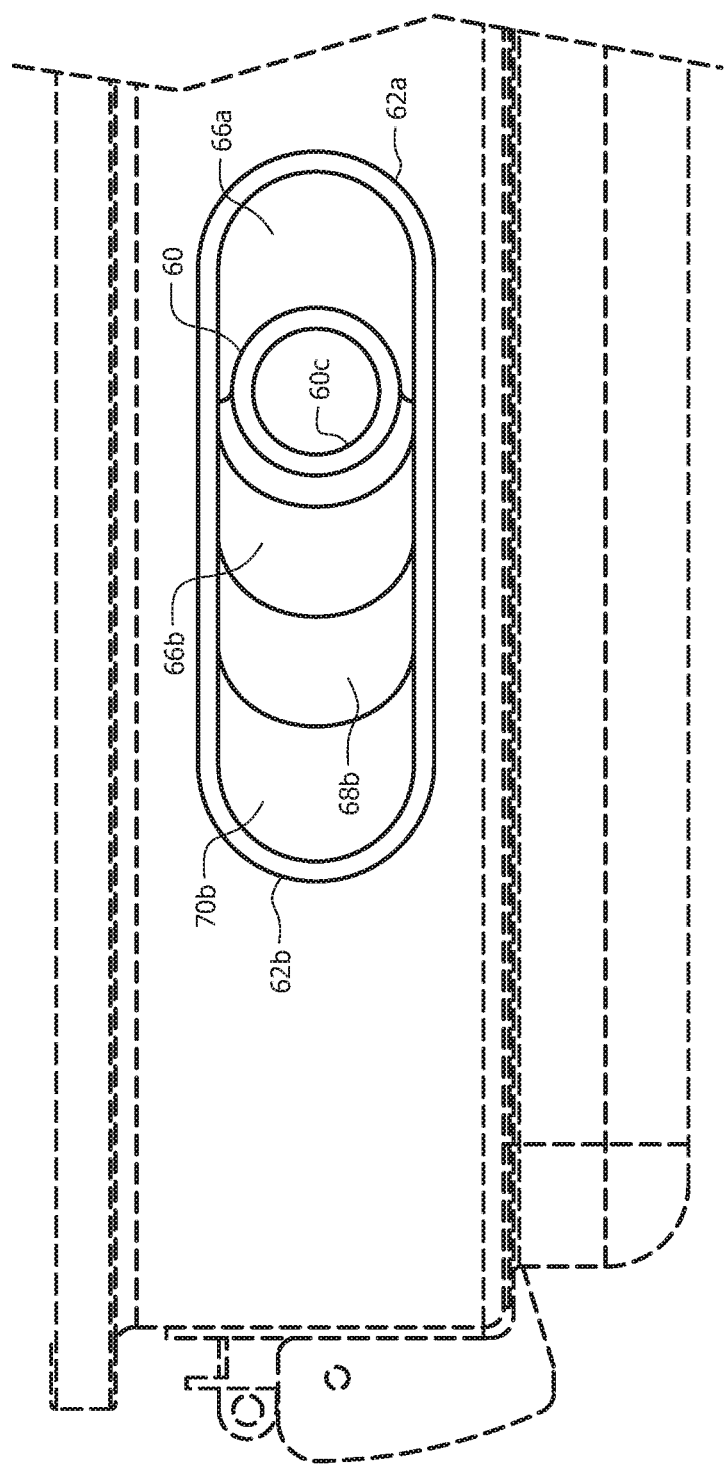
FIG. 4E is a side elevation view of an assembled VGC component when the center of the grommet is in its fully retracted position.

FIG. 4E depicts the fully retracted position of grommet 60 where it has slid in its guide track towards the first end of collector 10 due to temperature-related contraction of the polymer absorber.

In the preferred embodiment, grommet 60 can slide about three-quarters of an inch in either direction from its central position but other distances are within the scope of this invention, i.e., differing polymer absorbers may have differing ranges between full extension and full retraction.

Figure 5B:
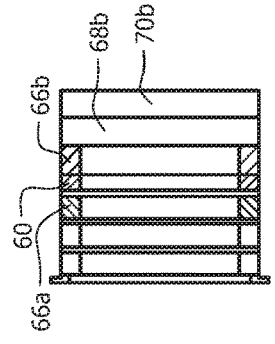
FIG. 5B is a sectional view taken along FIG. 5B-5B in FIG. 5A.
Figure 5D:
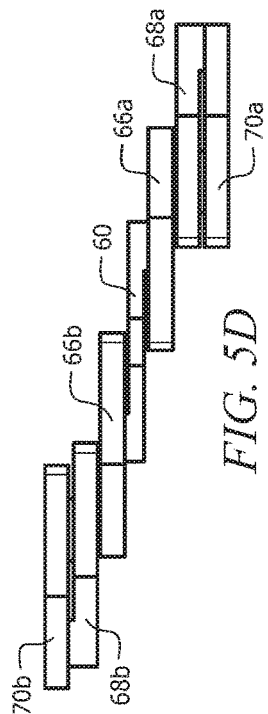
FIG. 5D is a plan view taken along line 5D-5D in FIG. 5A.
Figure 5A:
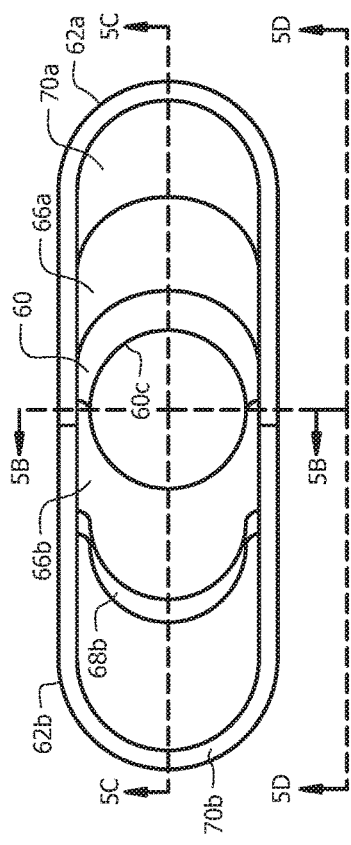
FIG. 5A is a side elevation view of the novel VGC component.
Figure 5C:
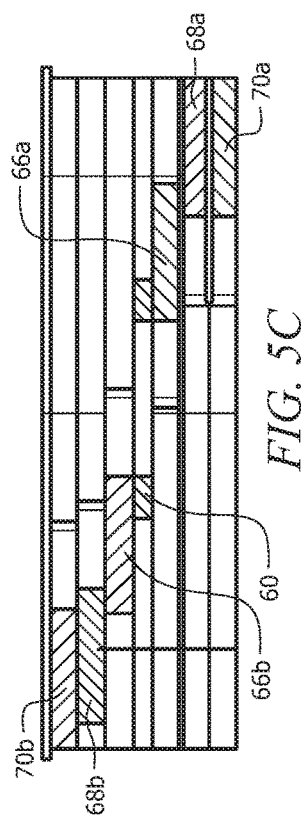
FIG. 5C is a sectional view taken along line 5C-5C in FIG. 5A.

FIGS. 5A-D depict the same parts disclosed in connection with the disclosure of FIGS. 4A-E. FIGS. 5A-D depict VGA component structure 36 when grommet 60 is slightly to the right of the center of said VGA component, said center being where parts 62a, 62b meet. The respective positions of the interior, middle, and exterior panels are depicted in FIG. 5A but those positions are best understood when comparing FIG. 5A with FIGS. 5B-D. For example, middle panel 68a is obscured in FIG. 5A by exterior panel 70a as depicted in FIG. 5C.

It should therefore be understood that grommet 60 engages interior panels 66a, 66b so that said interior panels slide when the grommet slides, the interior panels engage middle panels 68a, 68b so that said middle panels slide when the interior panels slide, and said middle panels engage exterior panels 70a, 70b so that said exterior panels slide when the middle panels slide. Outside or ambient air therefore cannot enter into the slots occupied by VGC component 36. Grommet 60 moves conjointly with the polymer absorber as said polymer absorber lengthens and shortens, thereby eliminating stress on the absorber tubes.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. A solar collector, comprising:
a housing having a hollow interior;
said housing including a transparent cover, a frame for holding said transparent cover, and a base;
a polymer absorber disposed within said hollow interior between said transparent cover and said base;
a plurality of latches secured to an exterior of said frame about a perimeter thereof;
each latch of said plurality of latches having an open configuration and a closed configuration, said frame and base being at least partially unconnected to one another when one or more of said plurality of latches are in said open configuration and said frame and base being connected to one another when each of said latches are in said closed configuration;
whereby said housing is opened and closed in the absence of tools;
said frame having sidewalls;
said base having sidewalls;
said frame pivotally secured to the base through a first manifold pipe extending between apertures formed in said sidewalls of said frame and base; and
whereby when said latches are in their respective open configurations, said collector is opened or closed by rotating said frame with respect to said base about said first manifold pipe.

2. The solar collector of claim 1, further comprising:
said frame having a square or rectangular structure formed by said sidewalls, wherein said sidewalls include a pair of longitudinally extending, transversely spaced apart sidewalls and a pair of transversely disposed, longitudinally spaced apart end walls; and
said base having a mating structure formed by said sidewalls, wherein said sidewalls include a pair of longitudinally extending, transversely spaced apart sidewalls and a pair of transversely disposed, longitudinally spaced apart end walls.

3. The solar collector of claim 2, further comprising:
each latch of said plurality of latches having a flat base secured to said sidewalls of said frame;
each latch having two mounting lugs extending from said flat base in normal relation thereto in lateral relation to one another on opposite sides of a vertical axis of symmetry of said flat base in equidistant relation to said vertical axis;
an aperture formed near a distal free end of each mounting lug;
each latch having further mounting lugs extending from said flat base in normal relation to said flat base in lateral relation to one another on opposite sides of and in equidistantly spaced relation to a vertical axis of symmetry of said flat base;
an aperture formed in the distal free end of each further mounting lug;
a latch pull pivotally connected at a first end to each further mounting lug, said latch pull having a preselected length so that a second end of said latch pull abuts said flat base adjacent each mounting lug when said latch pull is pivoted from said open configuration to said closed configuration; and
said latch pull having a thickness less than an extent of each mounting lug so that when said latch pull abuttingly engages said flat base, said apertures formed in said mounting lugs are adapted to receive a pin therethrough, said pin preventing reverse pivoting of each latch pull.

4. The solar collector of claim 3, further comprising:
a first end said latch catch being pivotally mounted to an associated latch pull;
said latch pull and latch catch being positioned in angular relation to one another when said latch catch is in its open configuration and when said latch pull is rotated from said open position to said closed position; and
said second end of said latch catch engaging and retaining said base, thereby securing said cover to said base when said latch pull abuts said flat base of said latch.

5. The solar collector of claim 2, further comprising:
a second transversely disposed manifold secured to a second end of polymer absorber;
a longitudinally-extending slot formed in a second end of each of said sidewalls of said frame, there being a pair of transversely spaced apart slots in said second end of said frame;
a longitudinally-extending slot formed in a second end of each of said sidewalls of said base, there being a pair of transversely spaced apart slots in said second end of said base;
said pairs of slots formed in said frame and base being in registration with one another;
a variable gate closure component positioned within both of said pairs of slots, there being two variable gate closure components in transversely spaced apart relation to one another; and
each of said variable gate closure components receiving an end of said second manifold.

6. The solar collector of claim 5, further comprising:
said variable gate closure including a flat, generally circular grommet having a flat formed in a top edge a bottom edge, and having an aperture formed centrally thereof; and
said aperture disposed in engaged relation to an associated end of said second manifold when said solar collector is fully assembled.

7. The solar collector of claim 6, further comprising:
said variable gate closure component including an elongate frame having a generally oblong configuration;
a plurality of guide tracks formed in an interior surface of said elongate frame;
said plurality of guide tracks including a center guide track that slideably receives said grommet;
said plurality of guide tracks including at least a pair of interior guide tracks formed in said interior surface on opposite, outboard sides of said center guide track;
an interior panel slideably received within each of said interior guide tracks; and
each interior panel of said pair of interior panels having a generally C-shaped structure and having flats formed in their respective top and bottom edges, said flats slideably engaging their respective guide tracks and being displaced when said grommet is displaced.

8. The solar collector of claim 7, further comprising:
said plurality of guide tracks further including at least a pair of middle guide tracks formed in said interior surface on opposite, outboard sides of said interior guide tracks;
a pair of middle panels slideably received within said middle guide tracks; and
each middle panel of said pair of middle panels having a generally C-shaped structure and having flats formed in their respective top and bottom edges, said flats slideably engaging their respective guide tracks and being displaced when said interior panels are displaced.

9. The solar collector of claim 8, further comprising:
said plurality of guide tracks further including at least a pair of exterior guide tracks formed in said interior surface on opposite, outboard sides of said middle guide tracks;
a pair of exterior panels slideably received within said exterior guide tracks; and
each exterior panel of said pair of exterior panels having a generally C-shaped structure and having flats formed in their respective top and bottom edges, said flats slideably engaging their respective guide tracks and being displaced when said middle panels are displaced.

10. A solar collector, comprising:
a housing having a hollow interior;
said housing including a cover, a frame for holding said cover, and a base;
a polymer absorber disposed within said hollow interior between said cover and said base;
said frame having a square or rectangular structure formed by a pair of longitudinally extending, transversely spaced apart sidewalls and a pair of transversely disposed, longitudinally spaced apart end walls;
said base pivotally secured to said frame through a first manifold pipe extending from a first manifold, the first manifold pipe being pivotally received at both ends by said base and said frame; and
whereby when said latches are in their respective open configurations, said collector is opened or closed by rotating said frame with respect to said base about said first manifold pipe.

11. The solar collector of claim 10, further comprising:
said frame having a square or rectangular structure formed by a pair of longitudinally extending, transversely spaced apart sidewalls and a pair of transversely disposed, longitudinally spaced apart end walls;
said base having a mating structure formed by a pair of longitudinally extending, transversely spaced apart sidewalls and a pair of transversely disposed, longitudinally spaced apart end walls;
said first manifold transversely secured to a first end of said polymer absorber;
an aperture formed in a first end of each of said sidewalls of said frame;
an aperture formed in a first end of each of said sidewalls of said base;
said apertures formed in said frame and base being in open registration with one another; and
said apertures pivotally receiving opposite ends of said first manifold pipe.

12. The solar collector of claim 11, further comprising:
a second transversely disposed manifold secured to a second end of polymer absorber;
a longitudinally-extending slot formed in a second end of each of said sidewalls of said frame, there being a pair of transversely spaced apart slots in said second end of said frame;
a longitudinally-extending slot formed in a second end of each of said sidewalls of said base, there being a pair of transversely spaced apart slots in said second end of said base;
said pairs of slots formed in said frame and base being in registration with one another;
a variable gate closure component positioned within each of said pairs of slots, there being two variable gate closure components in transversely spaced apart relation to one another; and
each of said variable gate closure components receiving an associated end of said second manifold.

13. The solar collector of claim 12, further comprising:
said variable gate closure including a flat, generally circular grommet having a flat formed in a top edge a bottom edge, and having an aperture formed centrally thereof; and
said aperture disposed in engaged relation to an associated end of said second manifold when said solar collector is fully assembled.

14. The solar collector of claim 13, further comprising:
said variable gate closure component including an elongate frame having a generally oblong configuration;
a plurality of guide tracks formed in an interior surface of said elongate frame;
said plurality of guide tracks including a center guide track that slideably receives said grommet;
said plurality of guide tracks including at least a pair of interior guide tracks formed in said interior surface on opposite, outboard sides of said center guide track;
an interior panel slideably received within each of said interior guide tracks; and
each interior panel of said pair of interior panels having a generally C-shaped structure and having flats formed in their respective top and bottom edges, said flats slideably engaging their respective guide tracks and being displaced when said grommet is displaced.

15. The solar collector of claim 14, further comprising:
said plurality of guide tracks further including at least a pair of middle guide tracks formed in said interior surface on opposite, outboard sides of said interior guide tracks;
a pair of middle panels slideably received within said middle guide tracks; and
each middle panel of said pair of middle panels having a generally C-shaped structure and having flats formed in their respective top and bottom edges, said flats slideably engaging their respective guide tracks and being displaced when said interior panels are displaced.

16. The solar collector of claim 14, further comprising:
said plurality of guide tracks further including at least a pair of exterior guide tracks formed in said interior surface on opposite, outboard sides of said middle guide tracks;
a pair of exterior panels slideably received within said exterior guide tracks; and
each exterior panel of said pair of exterior panels having a generally C-shaped structure and having flats formed in their respective top and bottom edges, said flats slideably engaging their respective guide tracks and being displaced when said middle panels are displaced.

* * * * *